United States Patent
Fontaine et al.

(10) Patent No.: US 9,537,282 B2
(45) Date of Patent: Jan. 3, 2017

(54) SYSTEM AND METHOD FOR A MULTI-MODE PUMP IN AN OPTICAL AMPLIFIER

(71) Applicant: Alcatel-Lucent USA Inc., Murray Hill, NJ (US)

(72) Inventors: Nicolas K. Fontaine, Aberdeen, NJ (US); Roland Ryf, Keyport, NJ (US); David Neilson, Old Bridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 284 days.

(21) Appl. No.: 14/145,199

(22) Filed: Dec. 31, 2013

(65) Prior Publication Data
US 2015/0085351 A1 Mar. 26, 2015

Related U.S. Application Data

(60) Provisional application No. 61/880,577, filed on Sep. 20, 2013.

(51) Int. Cl.
| | |
|---|---|
| *G02B 6/25* | (2006.01) |
| *H01S 3/067* | (2006.01) |
| *H01S 3/094* | (2006.01) |
| *G02B 6/14* | (2006.01) |
| *G02B 6/02* | (2006.01) |

(Continued)

(52) U.S. Cl.
CPC ..... *H01S 3/094065* (2013.01); *H01S 3/06737* (2013.01); *H01S 3/094057* (2013.01); *G02B 6/02042* (2013.01); *G02B 6/14* (2013.01); *G02B 6/2552* (2013.01); *H01S 3/06754* (2013.01);
(Continued)

(58) Field of Classification Search
CPC .. H01S 3/06737; H01S 3/094065; G02B 6/14; G02B 6/02042; G02B 6/2552
See application file for complete search history.

(56) References Cited

U.S. PATENT DOCUMENTS 3,761,716 A * 9/1973 Kapron ................... H04J 14/04
398/44
3,772,528 A * 11/1973 Anderson ............... G02F 1/395
257/E45.006
(Continued)

FOREIGN PATENT DOCUMENTS

| CN | 101714740 A | 5/2010 |
|---|---|---|
| EP | 1191372 A2 | 3/2002 |

(Continued)

OTHER PUBLICATIONS

International Searching Authority; International Search Report and Written Opinion; International Application No. PCT/US14/055854; Nov. 7, 2014; 13 pgs.

*Primary Examiner* — Eric Bolda
(74) *Attorney, Agent, or Firm* — Loza & Loza, LLP

(57) ABSTRACT

An optical amplifier includes a multi-mode pump laser module, a multi-mode waveguide, a multi-mode to multiple single-mode fiber converter module and a plurality of single-mode cores. The multi-mode pump laser module emits pump light having a plurality of modes to the multi-mode fiber or waveguide. The multi-mode waveguide propagates the emitted pump light to the converter module. The converter module receives the pump light and distributes the pump light approximately uniformly to a plurality of single-mode cores.

13 Claims, 8 Drawing Sheets

(51) Int. Cl.
*G02B 6/255* (2006.01)
*H01S 3/30* (2006.01)

(52) U.S. Cl.
CPC ......... *H01S 3/094069* (2013.01); *H01S 3/302* (2013.01)

(56) References Cited

U.S. PATENT DOCUMENTS

| | | | | |
|---|---|---|---|---|
| 4,804,248 | A * | 2/1989 | Bhagavatula | H04B 10/2581 385/28 |
| 5,130,995 | A * | 7/1992 | Grossman | H01S 3/117 372/107 |
| 5,864,644 | A * | 1/1999 | DiGiovanni | G02B 6/2856 385/43 |
| 6,208,678 | B1 | 3/2001 | King | |
| 6,238,100 | B1 * | 5/2001 | Sasaki | G02B 6/421 385/59 |
| 6,269,210 | B1 * | 7/2001 | Yagi | G02B 6/4403 385/110 |
| 6,397,636 | B1 * | 6/2002 | DiGiovanni | G02B 6/2856 65/395 |
| 6,714,581 | B2 * | 3/2004 | Corcoran | H01S 5/4062 372/101 |
| 6,778,732 | B1 | 8/2004 | Fermann | |
| 7,016,573 | B2 * | 3/2006 | Dong | G02B 6/2551 385/46 |
| 7,409,128 | B2 * | 8/2008 | Holcomb | H01S 3/094003 372/6 |
| 7,437,046 | B2 * | 10/2008 | DiGiovanni | G02B 6/0365 385/126 |
| 7,492,993 | B2 * | 2/2009 | Nakai | G02B 6/2835 385/15 |
| 7,492,998 | B2 * | 2/2009 | Miller | C03C 25/107 385/115 |
| 7,532,792 | B2 * | 5/2009 | Skovgaard | G02B 6/02376 385/24 |
| 7,627,007 | B1 * | 12/2009 | Armstrong | G02F 1/3501 372/21 |
| 7,738,751 | B1 * | 6/2010 | Minden | G02B 6/04 372/6 |
| 7,742,512 | B2 * | 6/2010 | Spariosu | H01S 3/067 372/29.023 |
| 8,351,113 | B2 * | 1/2013 | Langseth | H01S 3/0675 359/341.3 |
| 8,472,765 | B2 * | 6/2013 | Holland | G02B 6/262 385/129 |
| 8,520,299 | B2 * | 8/2013 | Digiovanni | G02B 6/02019 359/341.3 |
| 8,687,270 | B2 * | 4/2014 | Manes | H01S 3/2333 359/342 |
| 8,693,088 | B2 * | 4/2014 | Fini | G02B 6/2835 359/334 |
| 8,768,117 | B2 * | 7/2014 | Seo | G02B 6/2852 385/126 |
| 8,818,151 | B1 * | 8/2014 | Ward | G02B 6/264 264/1.28 |
| 8,830,568 | B2 * | 9/2014 | Savage-Leuchs | G02B 6/02009 359/341.3 |
| 8,837,885 | B2 * | 9/2014 | Seo | G02B 6/2821 359/341.1 |
| 8,903,211 | B2 * | 12/2014 | Fini | G02B 6/2856 359/341.32 |
| 9,007,681 | B2 * | 4/2015 | Zhu | G02B 6/02347 359/341.1 |
| 9,025,239 | B2 * | 5/2015 | Zhu | H01S 3/06737 359/341.1 |
| 2002/0197032 | A1 * | 12/2002 | Conrad | G02B 6/4482 385/114 |
| 2003/0031442 | A1 * | 2/2003 | Siegman | G02B 6/0285 385/124 |
| 2003/0165313 | A1 * | 9/2003 | Broeng | G02B 6/02357 385/125 |
| 2004/0086221 | A1 * | 5/2004 | Qiu | G02B 6/2937 385/24 |
| 2004/0114212 | A1 | 6/2004 | Hwang et al. | |
| 2004/0175082 | A1 * | 9/2004 | Birks | C03B 37/01205 385/123 |
| 2005/0105854 | A1 * | 5/2005 | Dong | G02B 6/2551 385/46 |
| 2005/0201427 | A1 * | 9/2005 | Luo | H01S 3/06708 372/23 |
| 2006/0045163 | A1 * | 3/2006 | Chuang | H01S 3/06754 372/100 |
| 2006/0045444 | A1 * | 3/2006 | Miller | C03C 25/107 385/115 |
| 2007/0003196 | A1 * | 1/2007 | Holcomb | H01S 3/094003 385/115 |
| 2009/0154503 | A1 * | 6/2009 | Peyghambarian | H01S 3/067 372/6 |
| 2009/0201575 | A1 | 8/2009 | Fermann et al. | |
| 2010/0008624 | A1 * | 1/2010 | Singer | G02B 6/30 385/24 |
| 2010/0278486 | A1 * | 11/2010 | Holland | G02B 6/262 385/43 |
| 2011/0280517 | A1 * | 11/2011 | Fini | G02B 6/02042 385/43 |
| 2013/0216184 | A1 * | 8/2013 | Kopp | G02B 6/30 385/43 |
| 2015/0085352 | A1 * | 3/2015 | Ryf | H01S 3/06754 359/341.33 |

FOREIGN PATENT DOCUMENTS

| | | |
|---|---|---|
| EP | 2131454 A1 | 12/2009 |
| WO | 2004036704 A2 | 4/2004 |

\* cited by examiner

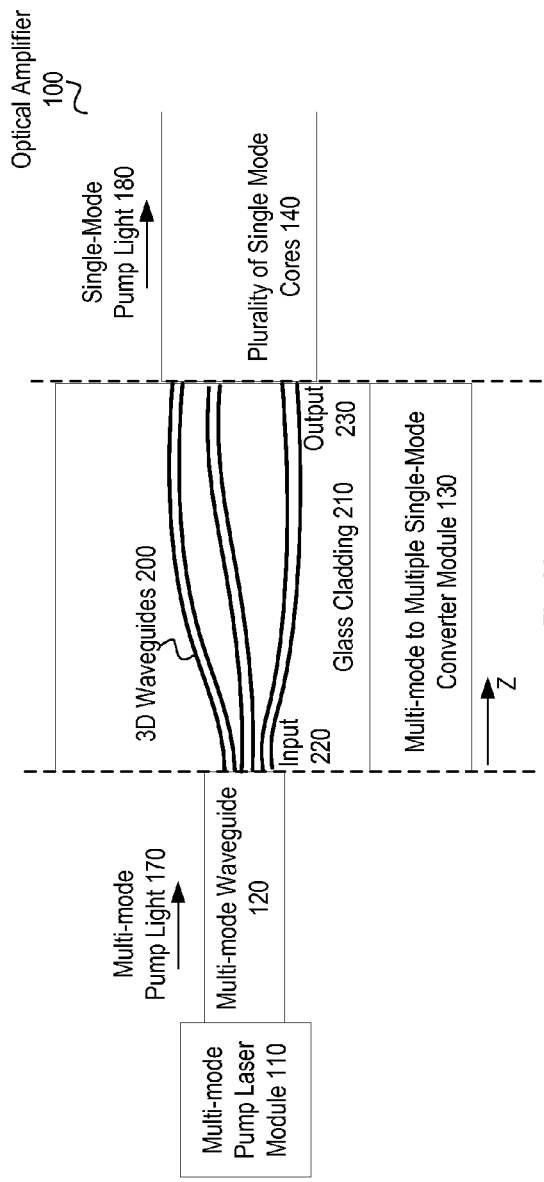
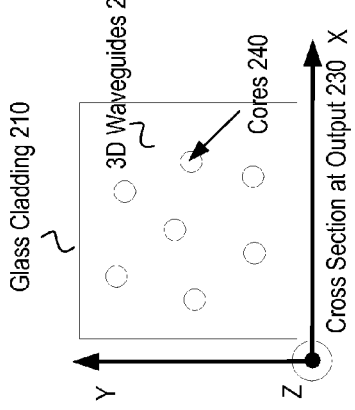
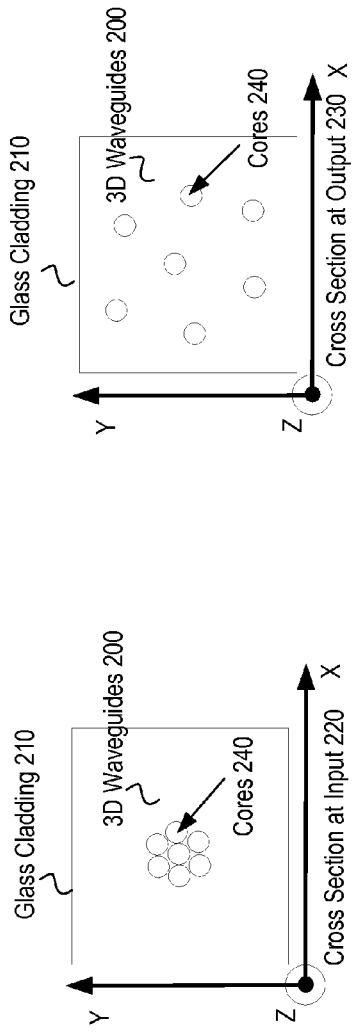
Fig. 2A
Fig. 2B
Fig. 2C

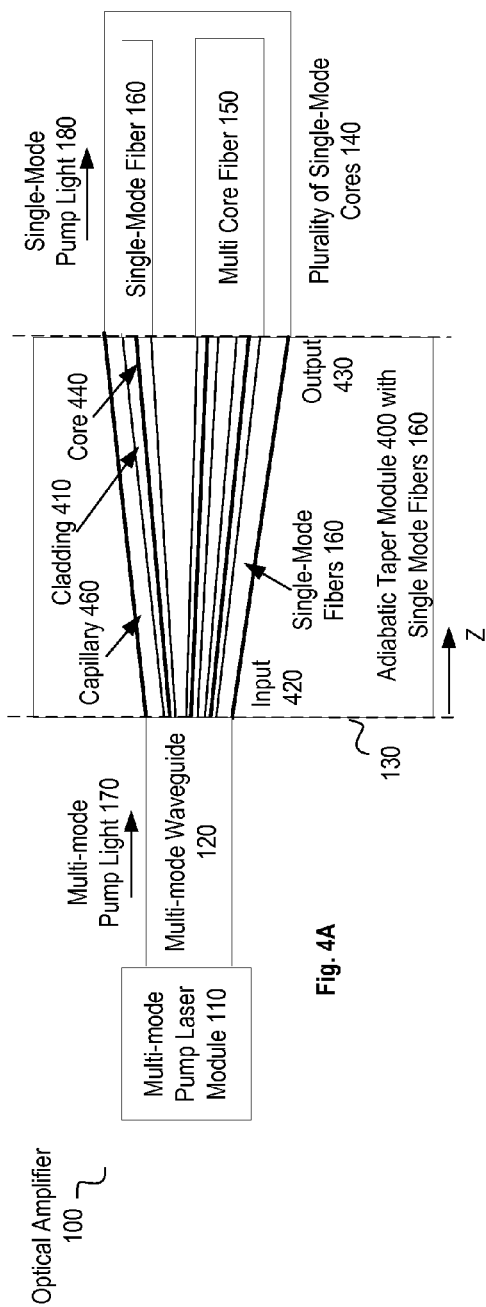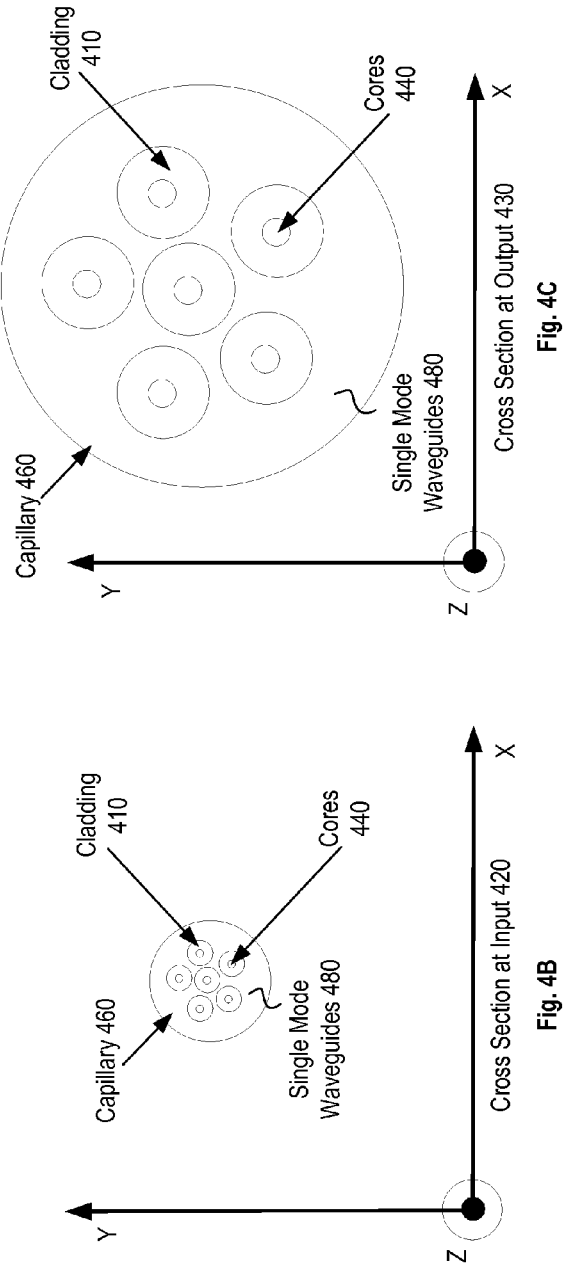
Fig. 4A
Fig. 4B
Fig. 4C

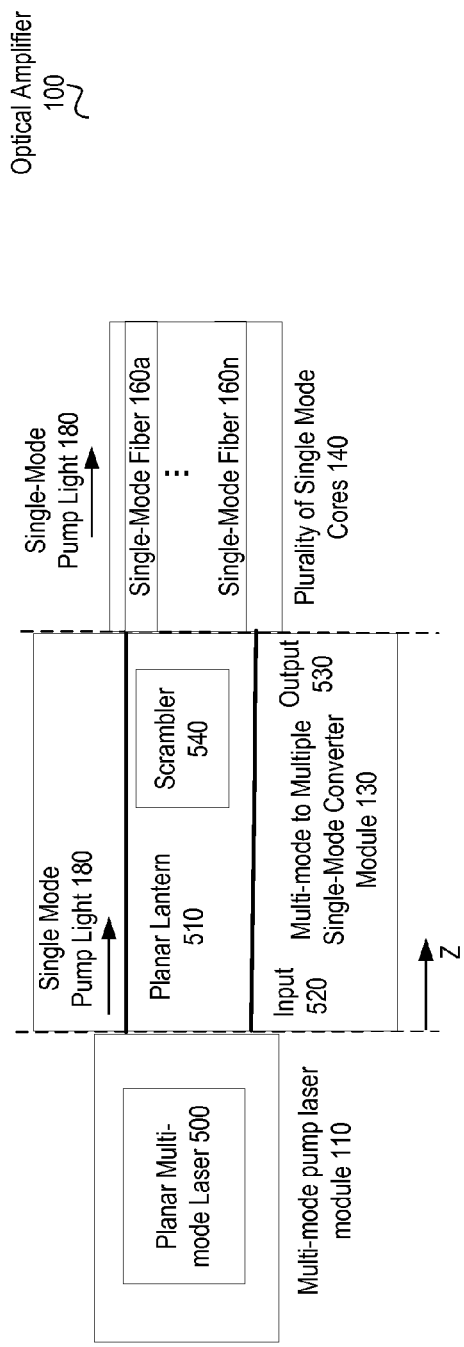
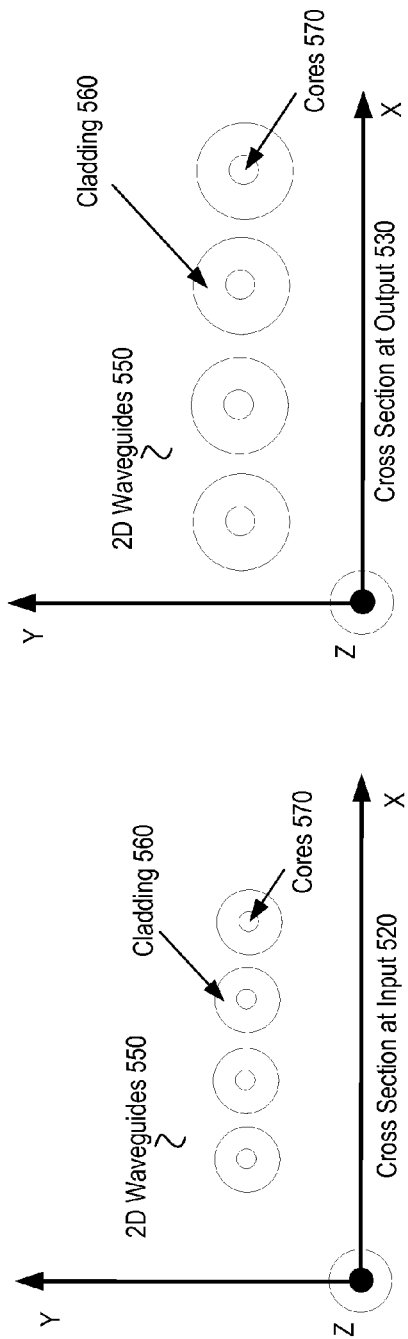
Fig. 5A
Fig. 5B
Fig. 5C

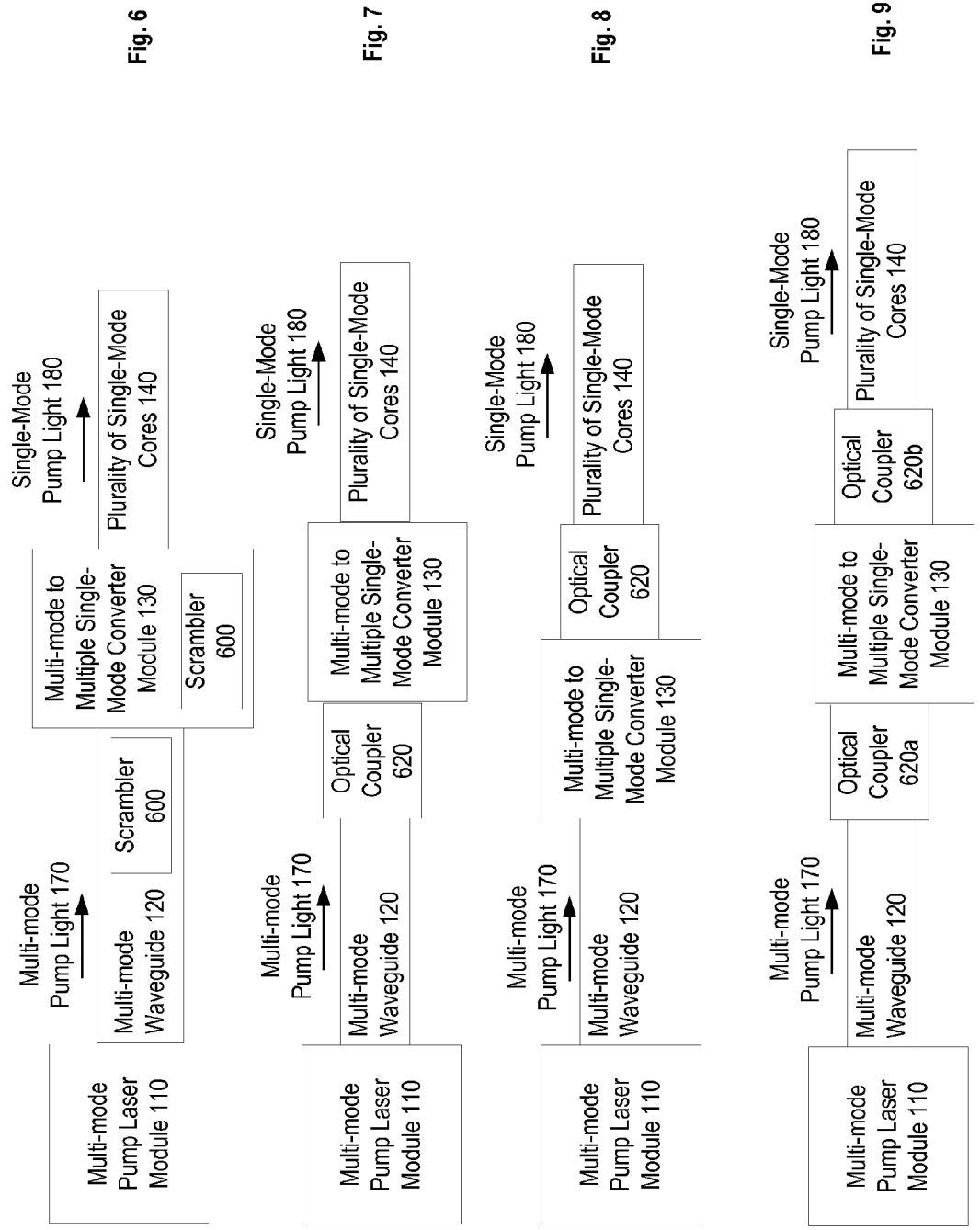

US 9,537,282 B2

SYSTEM AND METHOD FOR A MULTI-MODE PUMP IN AN OPTICAL AMPLIFIER

CROSS-REFERENCE TO RELATED PATENTS

The present U.S. Utility patent application claims priority pursuant to 35 U.S.C. §119(e) to U.S. Provisional Application Ser. No. 61/880,577, entitled, "SYSTEM AND METHOD FOR A MULTI-MODE PUMP IN AN OPTICAL AMPLIFIER," filed Sep. 20, 2013, which is incorporated by reference herein and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND

Technical Field

This disclosure relates generally to optical nodes and more particularly, but not exclusively, to systems and methods for optical amplification of optical signals.

Description of Related Art

The statements in this section provide a description of related art and are not admissions of prior art. An optical amplifier is a device that amplifies an optical signal directly in the optical domain without converting the optical signal into a corresponding electrical signal. Optical amplifiers are widely used, for example, in the fields of optical communications.

One type of an optical amplifier is a doped-fiber amplifier, with a well-known example being the Erbium-doped fiber amplifier (EDFA). In operation, a signal to be amplified and a pump beam are multiplexed into the doped fiber. The pump beam excites the doping ions, and amplification of the signal is achieved by stimulated emission of photons from the excited dopant ions.

Another type of an optical amplifier is a Raman amplifier, which relies on stimulated Raman scattering (SRS) for signal amplification. A Raman amplifier uses the intrinsic properties of silica fiber to obtain signal amplification, such that transmission fibers themselves can be used as a medium for amplification, allowing the attenuation of data signals transmitted over the fiber to be mitigated within the fiber itself. More specifically, when a signal to be amplified and a pump beam are multiplexed into an optical fiber made of an appropriate material, a lower-frequency signal photon induces SRS of a higher-frequency pump photon, which causes the pump photon to pass some of its energy to the vibrational states of the fiber material, thereby converting the pump photon into an additional signal photon. An amplifier working on the basis of this principle is commonly known as a distributed Raman amplifier (DRA) or simply a Raman amplifier. The pump beam may be coupled into the fiber in the same direction as the signal (co-directional or co-pumping) or in the opposite direction (contra-directional or counter-pumping). The counter- and co-propagating Raman amplifiers are a marked improvement on this technology. In contrast to the standard Raman amplifier where a single counter-propagating Raman pump signal is responsible for the amplification of the traffic signals in the fiber, a counter-propagating and a co-propagating Raman amplifier may be used together. Together the co- and counter-propagating Raman pumps provide amplification to combat signal attenuation in fiber extending the reach of an optical span.

A multi-core fiber (MCF) increases a number of cores within a cladding of a single fiber. Multi-core fiber has the potential to increase data rates by using spatial division multiplexing (SDM). By increasing the number of cores within a single fiber, the information carrying capacity of the fiber is dramatically increased. Multi-core fibers have many times the signal-carrying capacity of traditional single-core fibers. Multi-core fibers may be employed in many applications ranging, e.g., from sensors to spatial division multiplexing to high density coupling.

A need exists for improved optical amplifiers to combat signal attenuation in multi-core fibers extending the reach of an optical span.

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which:

FIGS. 2A-C illustrate a schematic block diagram of another embodiment of an optical amplifier, in which a converter module interfaces with a plurality of single-mode cores of an optical fiber, such as in the embodiment of FIG. 1A;

FIGS. 4A-C illustrate a schematic block diagram of another embodiment of an optical amplifier, in which a converter module interfaces with one or more single-mode optical fibers and one or more multi-core optical fibers;

FIGS. 5A-C illustrate a schematic block diagram of another embodiment of an optical amplifier, in which a converter module interfaces with a plurality of single-mode optical fibers, such as in the embodiment of FIG. 1C;

FIG. 6 illustrates a schematic block diagram of another embodiment of an optical amplifier, in which a mode scrambler is placed before or within the mode converter module of FIGS. 1A-C;

FIG. 7 illustrates a schematic block diagram of another embodiment of an optical amplifier, in which an optical coupler is placed before the mode converter module of FIGS. 1A-C;

FIG. 8 illustrates a schematic block diagram of another embodiment of an optical amplifier, in which an optical coupler is placed after the mode converter module of FIGS. 1A-C;

FIG. 9 illustrates a schematic block diagram of another embodiment of an optical amplifier, in which an optical coupler is placed before and after the mode converter module of FIGS. 1A-C;

DETAILED DESCRIPTION OF THE INVENTION

Figure 1A:
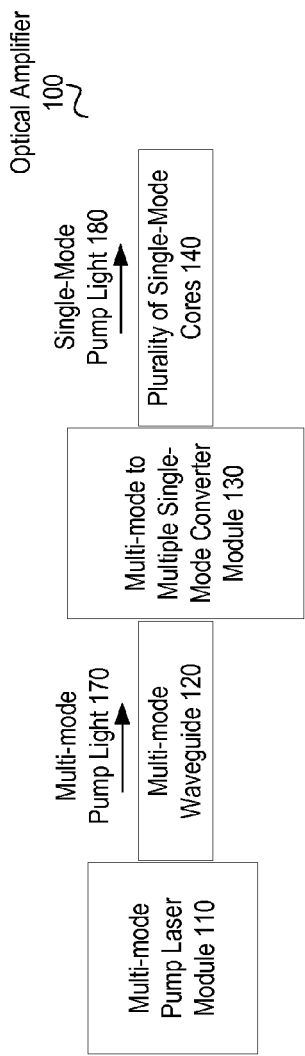
FIGS. 1A-C illustrate schematic block diagrams of embodiments of an optical amplifier that includes a multi-mode to multiple single-mode converter module.

An optical fiber may be a flexible filament of extruded glass (silica) capable of carrying information in the form of an optical signal, e.g. light. The two main elements of an optical fiber are a core, typically made of silica glass, and a cladding. The core includes the axial part of the optical fiber and is typically made of silica glass. The optical signal propagates primarily within the core, with a smaller portion propagating within the cladding via an evanescent component. The cladding typically surrounds the core, and may include one or more material layers. The refractive index of the core is generally higher than that of the cladding, so that light in the core intersects the interface with the cladding at a grazing angle, gets trapped in the core by internal reflection, and travels in the proper direction down the length of the fiber to its destination. Surrounding the cladding is usually another layer, called a coating, which typically includes protective polymer layers. Buffers may also be used as further protective layers applied on top of the coating. Other or additional layers may be employed in an optical fiber.

Fibers that support only one mode of transmission are called single-mode fibers (SMF), while those that support multiple propagation paths or transverse modes are called multi-mode fibers (MMF). Single-mode fibers have a smaller core diameter (e.g., diameter of 8.3 to 10 microns, depending on signal wavelength) designed such that the light travels substantially along one path or in one ray since in general only the lowest order bound mode propagates at the wavelength of interest. Single-mode (also sometimes called monomode) fibers typically have lower fiber attenuation than multi-mode fibers, and typically have lower wavelength-dependent dispersion. Thus the propagating signal usually retains better fidelity of the propagating signal in the single-mode fiber than in multi-mode fiber. As such, single-mode fibers are generally used for longer communication links.

For a given signal wavelength, multi-mode fibers have a larger core diameter, compared to single-mode fibers, allowing for a number of modes or paths of propagation through the core. Different guided modes of the multi-mode fiber are modulated with different modulated optical signals or different combinations of a given set of modulated optical signals. For a given wavelength $\lambda$, a multi-mode fiber is defined when the normalized frequency parameter (V, also referred to as the V number) is greater than approximately 2.405. Equation (1) gives the expression for V:

$$V=(\pi d/\lambda)NA \quad (1)$$

wherein d is the diameter of the fiber core and NA is the numerical aperture of the fiber. NA is defined below in Equation (2):

$$NA=\text{Square Root}((n_1)^2-(n_2)^2) \quad (2)$$

Where $n_1$ is the core refractive index and $n_2$ is the cladding refractive index. From this equation, it is seen that the diameter of a multi-mode fiber core is larger than the wavelength of the light signal, thus allowing for multiple paths or rays through the fiber core. The number of modes, N, is defined by equations (3) and (4) below:

$$N=V^2/2 \text{ for step index fiber} \quad (3)$$

$$N=V^2/4 \text{ for graded index fiber} \quad (4)$$

Theory shows, and experiments confirm, that for single-mode operation, V equals approximately 2.405 or less. Therefore, a fiber designed to conduct only one mode is characterized by one or more of a smaller core diameter, d, a larger operating wavelength, and $n_2$ being as close to $n_1$ as possible.

In practice, a core diameter of a single-mode fiber is about 10 um or less, the range of operating wavelengths typically starts at about 1300 nm, and the relative refractive index $\Delta$ ($R_{cladding}/R_{core}-1$), is less than about 0.4%. The result is a fiber that rejects all higher-order modes and conducts only one fundamental mode—a beam traveling exactly along the centerline of the fiber. The characteristics of typical multi-mode fibers include a core diameter of 50, 62.5, or even 1,000 μm; an operating wavelength range starting in the visible light region (~390-~700 nm); and a relative refractive index that is a minimum of 1% and, typically, 2% or higher.

A multi-core fiber (MCF) has more than one core within a cladding of a single fiber. Multi-core fiber has the potential to increase data rates by using spatial division multiplexing, e.g. multiplexing data among the several individual cores. By increasing the number of cores within a single fiber, the information carrying capacity of the fiber may be dramatically increased. The potential signal carrying capacity of multi-core fibers is many times that of traditional single-core fibers. Multi-core fibers may be employed in many applications ranging, e.g., from sensors to spatial division multiplexing to high density coupling.

Optical amplifiers for multi-core fibers include cladding-pumped or core-pumped amplifiers. Cladding-pumped amplifiers may use a high-power, uncooled, multi-mode pump laser that may be less expensive that more stable alternatives. The multi-mode lasers are operable to be directly coupled into the cladding and provide gain to the multiple cores of doped fibers. For example, a cladding-pumped amplifier includes one or more multi-mode laser diodes for cladding-pumping an Erbium (Er) doped multi-core fiber or Ytterbium (Yb) doped multi-core fiber or Er/Yb co-doped multi-core fiber to amplify the optical signals in the cores.

Core-pumped amplifiers for multi-core fibers may include several single-mode pumps for pumping light into the multiple cores of doped multi-core fibers. Single-mode pumps typically emit light in a narrow spectral band that increases coherence and enables the emitted pump light to be focused to a diffraction-limited spot size. The single-mode pumps in a core-pumped amplifier operating at higher powers often require a thermoelectric cooler (TEC) and thermistor, and are thus more complex and more expensive than a multi-mode pump. However, core-pumped amplifiers may have improved gain flatness and lower noise than cladding-pumped amplifiers.

As such, it would be advantageous to employ a high power but less complex and less expensive multi-mode pump laser in a core-pumped amplifier. However, multi-mode pump lasers emit light having a larger wavelength spectrum than single mode pump lasers. Multi-mode pump lasers output multimode light exhibiting power spectral lines around a center wavelength within a wavelength range. The multi-mode light may also exhibit divergence, e.g. different foci of light propagating in two perpendicular planes. For example, the output light may be divergent (such as approximately 30-40 degrees) in the vertical direction. The lack of coincidence of the foci limits the ability to focus the output multimode light to a small, sharp well-defined point. As such, multi-mode equipment may not efficiently launch (e.g. inject) light into a single-mode fiber. This inefficiency makes the use of multi-mode pumps in core pumping amplifiers more difficult.

These and other pertinent problems are addressed by various embodiments described herein of an optical amplifier operable to use a multi-mode pump laser in a core-pumped optical amplifier for multi-core fibers. In various embodiments, the optical amplifier distributes pump light from a multi-mode pump to a plurality of single-mode cores (e.g., either of a multi-core fiber or to a plurality of single-mode fibers) using a multi-mode to multiple single-mode converter module. Thus, various embodiments of the optical amplifier described herein enable the use of a high power, less expensive multi-mode pump laser in a core-pumped optical amplifier.

Figure 1B:
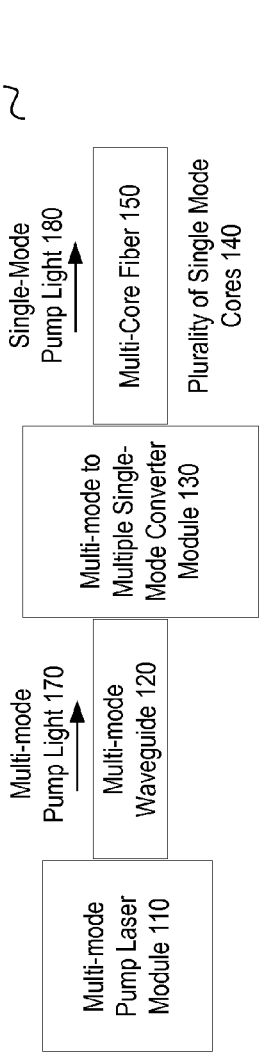
Figure 1C:
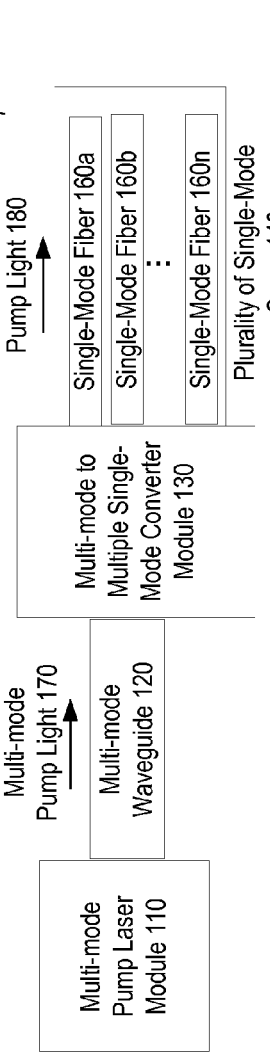

FIGS. 1A-C illustrates schematic block diagrams of embodiments of an optical amplifier 100. The optical amplifier 100 shown in FIG. 1A includes a multi-mode pump laser module 110, multi-mode waveguide 120, a multi-mode to multiple single-mode fiber converter module 130 and a plurality of single-mode cores 140. The multi-mode pump laser module 110 includes a laser, e.g. a semiconductor laser such as a laser diode, configured to emit multi-mode pump light 170. The multi-mode pump light 170 from the multi-mode pump laser module 110 generally exhibits multiple spectral lines around a center wavelength and may also exhibit divergence, e.g. different foci of light propagating in two perpendicular planes. The multi-mode pump laser module 110 may further include thermal and/or electrical management of the center wavelength and wavelength range. The multi-mode pump laser module 110 may also include automatic gain control (AGC), automatic level control (ALC), and automatic current control (ACC) to control the operation mode of the laser.

The multi-mode laser pump module 110 is operably coupled to the multi-mode fiber or waveguide 120, e.g. a multi-mode fiber. The multi-mode waveguide 120 is operable to propagate the emitted pump light 170 from the multi-mode laser pump module 110 to the converter module 130. In some embodiments, the multi-mode waveguide 120 is included in the multi-mode laser pump module 110 or converter module 130. Converter module 130 receives the multi-mode pump light 170 and converts the multi-mode pump light 170 into single-mode pump light 180. The converter module 130 may distribute the pump light 170 approximately uniformly to a plurality of single-mode cores 140. FIGS. 2-5 further describe embodiments of converter 130 herein below.

In an embodiment, the plurality of single-mode cores 140 includes one or more multi-core fibers 150 as shown in FIG. 1B. The multi-core fiber 150 includes a plurality of single-mode cores surrounded by a common cladding. In another embodiment, the plurality of single-mode cores 140 includes a plurality of multi-core fibers, either physically separate or with different claddings but included within a common coating and buffer.

In another embodiment, the plurality of single-mode cores 140 includes a plurality of single-mode fibers 160a-n as shown in FIG. 1C. An instance of a single-mode fiber 160 includes a single-mode core and cladding. The single-mode fibers 160a-n may be physically separate or included within a common coating and buffer. In another embodiment, the plurality of single-mode cores 140 includes a combination of one or more multi-core fibers and one or more single-mode fibers 160.

Various additional components, such as variable optical attenuators, optical add-drop multiplexers, optical filters, optical scramblers, optical couplers, etc., may be incorporated into optical amplifier 100.

FIGS. 2A-C illustrate a schematic block diagram of another embodiment of optical amplifier 100. In this embodiment, the converter module 130 includes a plurality of laser inscribed three dimensional (3D) waveguides 200 in a glass cladding 210, such as glass block or other shaped glass cladding. Though glass cladding 210 is described herein, similar or other types of cladding with inscribed or embedded waveguides may also be employed. In an embodiment, the glass cladding 210 is a glass block, though other shapes of glass claddings may also be employed.

The plurality of 3D waveguides 200 at input 220 are spaced to effectively behave as one multi-mode waveguide. FIG. 2B illustrates an example embodiment of a cross section of input 220. The cores 240 of 3D waveguides 200 at input 220 are spaced in close proximity such that the effective normalized frequency parameter V of the plurality of cores 240 of 3D waveguides 200 is greater than about 2.405 to effectuate a multi-mode input. For example, due to the close spacing of cores 240, the effective diameter of the 3D guides approximates the total diameter measured across the plurality of cores 240 or a sum of the diameters of the plurality of cores. Since the normalized frequency diameter V is proportional to the diameter of the core, the normalized frequency parameter V increases with increased diameter. With the effective diameter about equal to the diameter across the plurality of cores due to their close spacing, the 3D waveguides may approximately behave as a single multi-mode waveguide with a single core.

The 3D waveguides 200 then increasingly diverge or separate in both or either the X and Y axis of the glass cladding 210 to output 230. FIG. 2C illustrates an example embodiment of a cross section of the 3D waveguides 200 at output 230. The 3D waveguides 200 at output 230 are separated such that individual 3D waveguides 200 collectively behave as a plurality of single-mode waveguides, e.g. the effective normalized frequency parameter V of individual ones of the plurality of the 3D waveguides 200 is approximately equal to or less than 2.405 thus effectuating a single-mode core at output 230. For example, due to the increased spacing between the 3D waveguides, the effective diameter of the 3D guides no longer is approximated by the total diameter measured across the plurality of cores. In addition, each of the cores of the 3D waveguides has an individual diameter such that the effective normalized frequency parameter V of each core is approximately equal to or less than 2.405. So the plurality of 3D waveguides effectively behaves at output 230 as a plurality of single-mode waveguides.

In operation, the multi-mode pump laser module 110 pumps multi-mode pump light 170 into multi-mode waveguide 120. The multi-mode waveguide 120 is optically coupled to converter module 130 to propagate multi-mode pump light 170 into the plurality of the 3D waveguide cores 240 through input port 220. Preferably, pump light 170 is received substantially uniformly by the plurality of 3D waveguide cores 200. To optimize the coupling, spot size and NA is approximately matched to the 3D waveguide cores 240. As the 3D waveguides 200 diverge in the glass cladding 210, the 3D waveguides 200 scramble the modes and polarization in the multi-mode pump light 170. As the modes and polarization are scrambled, single-mode pump light 180 is expected to exhibit a more even distribution of power across the modes. Furthermore, due to the increased spacing between the cores 240 of the 3D waveguides, the plurality of 3D waveguides 200 effectively behave at output 230 as a plurality of single-mode waveguides. As such, the 3D waveguides 200 at output 220 effectively behave as a plurality of single-mode waveguides emitting single-mode pump light.

In an embodiment, a mode scrambler may be incorporated in the multi-mode waveguide 120 or converter module 130 to further scramble modes of the pump light 170. Similarly, in an embodiment, a polarization scrambler may be incorporated in the multi-mode waveguide 120 or converter module 130 to further scramble polarization of the pump light 170. In an embodiment, multi-mode pump laser module 110 emits pump light 170 exhibiting differing frequencies and/or modes over time to produce a time-dependent change of wavelengths and mixing of modes between wavelengths.

Multi-mode waveguide 120 may be optically coupled to converter 130 by slicing the multi-mode waveguide 120 to approximately align in size and shape the core of the multi-mode waveguide with the cores 240 of the 3D waveguides 200 at input 220 of converter module 130. The multi-mode waveguide 120 and the converter module 130 may be cleaved, spliced together and then adhesively or otherwise mechanically attached, e.g. by fusing with heat. Optical fiber connectors or removable connections may be employed as well or alternatively.

In another embodiment, an optical coupler or one or more lenses are included between the multi-mode waveguide 120 and the converter module 130, e.g. to change dimension (e.g. spot size) and/or focus of the multi-mode pump light 170 output by the multi-mode waveguide 120. In some embodiments the dimension and/or focus are selected to approximately match the diameter of the cores 240 of the 3D waveguides 200 at input 220.

Figure 3A:
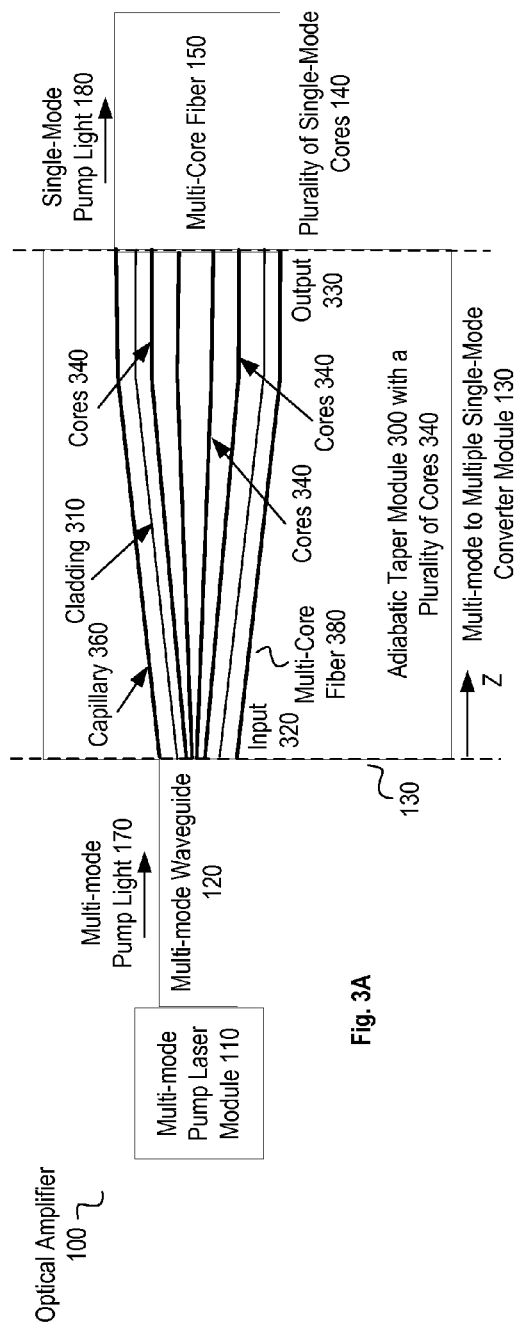
FIGS. 3A-C illustrate a schematic block diagram of another embodiment of an optical amplifier, in which a converter module interfaces with multi-core optical fiber, such as in the embodiment of FIG. 2A.
Figure 3B:
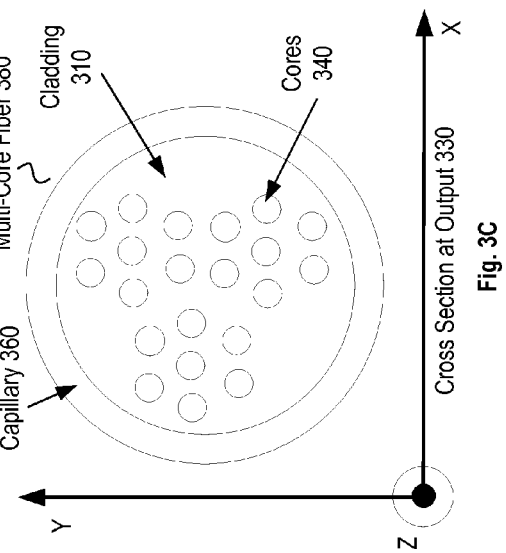
Figure 3C:
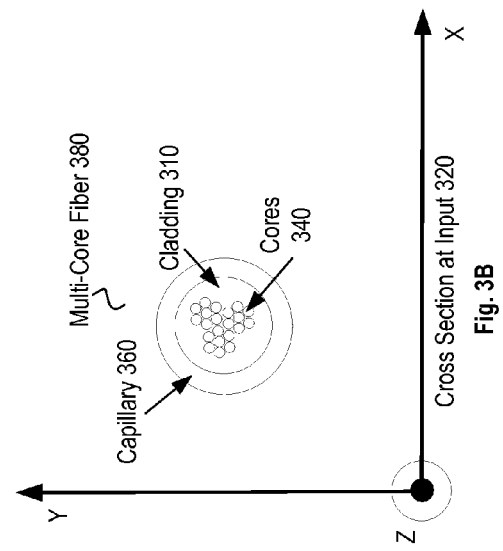

FIGS. 3A-C illustrate a schematic block diagram of another embodiment of optical amplifier 100. In this embodiment, the converter module 130 includes an adiabatic taper module 300 having a multi-core fiber 380 within a capillary 360. The multi-core fiber 380 includes a cladding 310 and single-mode cores 340. The embodiment operates on the principle that multi-mode pump light 170 is initially guided within the cladding at an input 320, and couples to the single-mode cores 340 as the light propagates to an output 320. FIG. 3B illustrates a cross section of the multi-core fiber 380. The single-mode cores 340 are closely packed with little or no space between the individual cores 340. The cores 340 are embedded within the cladding 310, which is bounded by the capillary 360. The capillary 360 has a lower refractive index than the cladding such that the multi-core fiber 380 is operable to guide the pump light 170 within the cladding. FIG. 3C illustrates a cross-section of an example embodiment of output 330 of the adiabatic taper module 300. In this embodiment the diameter of the multi-core fiber 380 is greater than that of the input 320. The diameter of multi-core fiber 380 is tapered such that the cores 340 are spaced in close proximity at input 320, and are isolated at output 330. In this context, "close proximity" means that at the wavelength of the pump light 170, the light couples to more than one of the individual cores 340. The term "isolated" in this context means that at the operating wavelength of the pump light 170, a portion of the pump light 170 propagating within one core 340 does not substantially couple to any other of the cores 340. Cores 340 that are in close proximity may touch neighboring cores 340 in some embodiments. Isolated cores 340 are separated from each other by cladding 310.

At the input 320 end of the multi-core fiber 380, the plurality of single-mode cores 340 are not expected to guide light individually. Moreover, the light is expected to substantially propagate within the cladding 310 due to the lower refractive index of the capillary 360 It is expected that the cores 340 will absorb a portion of the pump light 170 due to overlap of the cladding propagating modes with the core propagating modes.

During operation the multi-mode waveguide 120 couples the multi-mode pump light 170 from the multi-mode pump laser module 110 to cladding 310 of the adiabatic taper module 300 at the input 320. Relatively little light is expected to couple to the cores 340 due to the small aperture of the cores 340. Thus, the multi-mode pump light 170 propagates in the cladding 310 with essentially no leakage from the multi-core fiber 380. This low refractive index creates internal reflection at the boundary between cladding and the capillary to substantially guide the pump light in the cladding.

As the diameter of the multi-core fiber 380 increases from the input 320 to the output 330 (positive Z direction in relation to the illustrated coordinate axes) the cores 340 diverge along the X and Y axes or in both the X and Y directions such that the distance between the cores 340 increases, e.g. monotonically. In some embodiments, and as illustrated is FIGS. 3B and 3C, the diameter of the cores 340 also increases from the input 320 to the output 330. Due to the change of geometry of the taper module 300 the multi-mode pump light 170 that is initially guided within the cladding 310 at input 320 transitions to being substantially guided within the cores 340 due to change in the effective refractive index of the cladding 310. It is thought that this transition occurs because, as the distance between the cores 340 increase, the multi-mode pump light 170 propagating within the cladding 310 intersects the boundary between the cores 340 and the cladding 310 at an angle greater than the confinement angle and is thereby captured by the cores 340. In a preferred embodiment the increase of diameter of the multi-core fiber 380 and the length of the module 300 are sufficient to ensure that multi-mode pump light 170 is substantially transferred to the multiple cores 340. The modes and polarization of multi-mode pump light 170 at input 320 are scrambled by the process, and pump light 170 exhibits a more even distribution of power across the modes. At output 330, the cores 340 effectively behave as single-mode outputs emitting single-mode pump light 180. The multi-core fiber 380 is operably, e.g. optically, coupled to multi-core fiber 150 at output 330 for propagation of pump light 170 through multi-core fiber 150.

In an embodiment, a mode scrambler may be incorporated in the multi-mode waveguide 120 or adiabatic taper module 300 to further scramble modes of the pump light 170. Similarly, in an embodiment, a polarization scrambler may be incorporated in the multi-mode waveguide 120 or adiabatic taper module 300 to further scramble polarization of the pump light 170. A polarization scrambler typically includes a polarization controller that is operable to vary the state of polarization of the pump light 170 within the multi-mode waveguide 120 and so randomize the average polarization over time of the pump light 170. One or more different polarization scramblers based on different technologies may be used, including LiNbO3 based scramblers, resonant fiber coil based scramblers, and fiber squeezer based scramblers.

In an embodiment, alternatively or in addition to the polarization scrambler, the multi-mode pump laser module 110 may emit pump light 170 that exhibits differing frequencies and modes over time to constantly change wavelengths and mix modes between wavelengths of the pump light 170.

Multi-mode waveguide 120 may be operably coupled to multi-core fiber 380 by slicing the multi-mode waveguide 120 to approximately align in size and shape to input 320 of multi-core fiber 380. The multi-mode waveguide 120 and multi-core fiber 380 may be cleaved, spliced together and then adhesively or otherwise mechanically attached or thermally fused. Optical fiber connectors or removable connections may be employed as well or alternatively.

In another embodiment, an optical coupler or one or more lenses are included between the multi-mode waveguide 120 and multi-core fiber 380 to alter the dimension and/or focus of pump light 170 output from the multi-mode waveguide 120 to the dimension of input 320 of multi-core fiber 380.

FIGS. 4A-C illustrate a schematic block diagram of another embodiment of an optical amplifier 100. In FIGS. 4B and 4C XYZ coordinate axes provide a reference in the following description. In this embodiment, the converter module 130 includes an adiabatic taper module 400 with a plurality of single-mode waveguides 480 (FIGS. 4B and 4C), each including a core 440 and cladding 410. The single-mode waveguides 480 are surrounded by a low refractive index capillary 460. FIGS. 4B and 4C respectively illustrate cross sections of an embodiment of input 420 and output 430 of the adiabatic taper module 400. In the illustrated embodiment, from the input 420 to the output 430 the diameter of the waveguide cores 440 and the capillary 460, and the thickness of the cladding 410, increase. While the embodiments of FIGS. 4B and 4C show space between the cladding 410 and the capillary 460, in other embodiments the cladding 410 may be in physical contact with the capillary 460. At the input 420 end light is thought to be substantially guided in the cladding 410 of the single-mode waveguides 480 due to the lower refractive index of the capillary 460.

In operation, at input 420, the pump light 170 from the multi-mode pump laser module 110 is expected to be substantially coupled to and propagated by the claddings 410. As the diameter of the cores 440 increases in the X and Y directions as Z increases, the effective refractive index of the cladding 410 is thought to increase. The pump light 170 that is guided in the cladding 410 at input 420 therefore transitions to propagation modes within the cores 440. In a preferred embodiment the length of the module 400 is sufficient to ensure that multi-mode pump light 170 is substantially transferred to the cores 440. As the pump light 170 transitions to propagation modes within the cores 440, the modes and polarization of pump light 170 is expected to be scrambled, resulting in a more even distribution of power across the modes at output 430. The cores 440 at output 420 are expected to effectively behave as single-mode outputs emitting single-mode pump light 180.

At output 430 of the adiabatic taper module 400, the single-mode cores 440 interface to a plurality of single-mode cores 140. In an embodiment, the single-mode cores 440 are operably, e.g. optically, coupled to the plurality of single-mode cores 140 to propagate single-mode pump light 180 to one or more single-mode fibers 160 at output 430. In another embodiment, the single-mode cores 440 are operably, e.g. optically, coupled to the plurality of single-mode cores 140 to propagate single-mode pump light 180 to one or more multi-core fibers 150 at output 430. In another embodiment, the single-mode cores 440 are operably, e.g. optically, coupled to the plurality of single-mode cores 140 to propagate single-mode pump light 180 to one or more single-mode fibers 160 and one or more multi-core fibers 150 at output 430.

In an embodiment, a mode scrambler may be incorporated in the multi-mode waveguide 120 or adiabatic taper module 400 to further scramble modes of the pump light 170. Similarly, in an embodiment, a polarization scrambler may be incorporated in the multi-mode waveguide 120 or adiabatic taper module 400 to further scramble polarization of the pump light 170. In an embodiment, multi-mode pump laser module 110 emits pump light 170 exhibiting differing frequencies and modes over time to provide a time-dependent change of wavelengths mode mixing between the wavelengths.

Multi-mode waveguide 120 may be operably, e.g. optically, coupled to adiabatic taper module 400 by slicing the multi-mode waveguide 120 to approximately align in size and shape to input 420. The multi-mode waveguide 120 and adiabatic taper module 400 may be cleaved, spliced together and then adhesively or otherwise mechanically attached or thermally fused. Optical fiber connectors or removable connections may be employed as well or alternatively.

In another embodiment, an optical coupler or one or more lenses are included between the multi-mode waveguide 120 and adiabatic taper module 400 to alter dimension and/or focus of multi-mode pump light 180 output from the multi-mode waveguide 120. In this manner the dimension of the beam output by the multi-mode waveguide 120 may be matched to the dimension of input 420.

FIGS. 5A-C illustrate a schematic block diagram of another embodiment of optical amplifier 100. In FIGS. 5B and 5C XYZ coordinate axes provide a reference in the following description. In this embodiment, the multi-mode pump laser module 110 includes a planar multi-mode laser 500. The planar multi-mode laser 500 is a single transverse mode laser that exhibits a substantially single transverse mode behavior at one or more particular lasing wavelengths. For example, the output pump light 180 exhibits a substantially single-mode in the X direction and multiple modes in the Y direction. The output pump light 180 is propagated to a planar lantern 510 with scrambler 520.

FIG. 5B illustrates an example embodiment of a cross section of input 520 to planar lantern 510. The planar lantern 510 includes a plurality of 2D waveguides 550 with cores 570 and cladding 560. The 2D waveguides 550 at input 520 are transversely spaced, e.g. along the X axis or other axis, to approximately align with the single transverse mode of the planar multi-mode laser 500. Similarly to FIG. 5B, the 2D waveguides 550 at output 530 are transversely spaced along the X axis or other axis to approximately align with the single transverse mode of the planar multi-mode laser 500. Since the 2D waveguides 550 at input 520 are transversely spaced along the X axis or other axis to approximately align with the single transverse mode of pump light 180, the pump light 180 has substantially a single-mode at input 520 of 2D waveguides 550. The 2D waveguides 550 at input 520 and output 530 are single-mode waveguides, e.g. the effective normalized frequency parameter V of individual ones of the plurality of the 2D waveguides 200 at input 520 and output 530 is approximately equal to or less than 2.405 to effectuate single-mode cores 570.

The converter module 130 also includes scrambler 540. When other modes leak or are absorbed at the input 520 of 2D waveguides 550, scrambler 540 is operable to scramble polarization modes of the pump light 180. The 2D waveguides at output 530 emit single-mode pump light 180 to the plurality of single-mode cores 140. In this embodiment, the plurality of single-mode cores 140 includes a planar array of single-mode fibers 160.

In another embodiment, the 2D waveguides 550 may diverge, or become increasingly separated, along the Z axis from input 520 to output 530. Thus the spacing between waveguide centers at the output 530 is greater than at the input 520. As with the first embodiment, the 2D waveguides 550 at input 520 are transversely spaced along the X axis or other axis to approximately align with the single transverse mode of the planar multi-mode laser 500. FIG. 5C illustrates an example embodiment of a cross section of the 2D waveguides 550 at output 530 in this second embodiment. As the 2D waveguides 550 diverge, the modes and polarization in the multi-mode pump light 170 are scrambled, and pump light 170 exhibits a more even distribution of power across any additional polarization modes. The 2D waveguides output substantially single-mode pump light 180 to a planar array of single-mode fibers 160.

In an embodiment, planar multi-mode laser 500 is operably coupled to planar lantern 510 by a multi-mode waveguide or by slicing the planar lantern 510 to approximately align in size and shape to a waveguide output of planar multi-mode laser 500. The planar multi-mode laser 500 and lantern 510 may then be adhesively or otherwise mechanically attached, or thermally fused. Optical fiber connectors or removable connections may be employed as well or alternatively. In another embodiment, an optical coupler or one or more lenses are included between the planar multi-mode laser 500 and lantern 510 to change dimension and/or focus of the output pump light 170 of the multi-mode laser 500 to the dimension of the cores 240 of the 2D waveguides 550 at input 520.

FIG. 6 illustrates a schematic block diagram of another embodiment of optical amplifier 100. In this embodiment, a scrambler 500 is incorporated in the multi-mode waveguide 120 or in the adiabatic taper module 400 (FIG. 4A) or in both the multi-mode waveguide 120 and adiabatic taper module 400. The scrambler 400 includes a mode scrambler or a polarization scrambler or both a mode and polarization scrambler to further scramble modes of the pump light 170.

FIG. 7 illustrates a schematic block diagram of another embodiment of optical amplifier 100. In this embodiment, multi-mode waveguide 120 is operably coupled to converter 130 by optical coupler 620. Optical coupler 620 includes one or more lenses to focus pump light 170 emitted from the multi-mode waveguide 120 to the dimensions of the input of converter module 130.

FIG. 8 illustrates a schematic block diagram of another embodiment of optical amplifier 100. In this embodiment, converter module 130 is operably coupled to the plurality of single-mode cores 140 by optical coupler 620. Optical coupler 620 includes one or more lenses to focus pump light 170 emitted from the converter 130 to the dimensions of the single-mode cores 140.

FIG. 9 illustrates a schematic block diagram of another embodiment of optical amplifier 100. In this embodiment, both multi-mode waveguide 120 and the plurality of single-mode cores are operably coupled to converter module 130 by respective optical couplers 620a and 620b. Optical coupler 620a includes one or more lenses to focus pump light 170 emitted from the multi-mode waveguide 120 to the dimensions of the input of converter module 130. Optical coupler 620b includes one or more lenses to focus pump light 170 emitted from the converter 130 to the dimensions of the single-mode cores 140.

Figure 10:
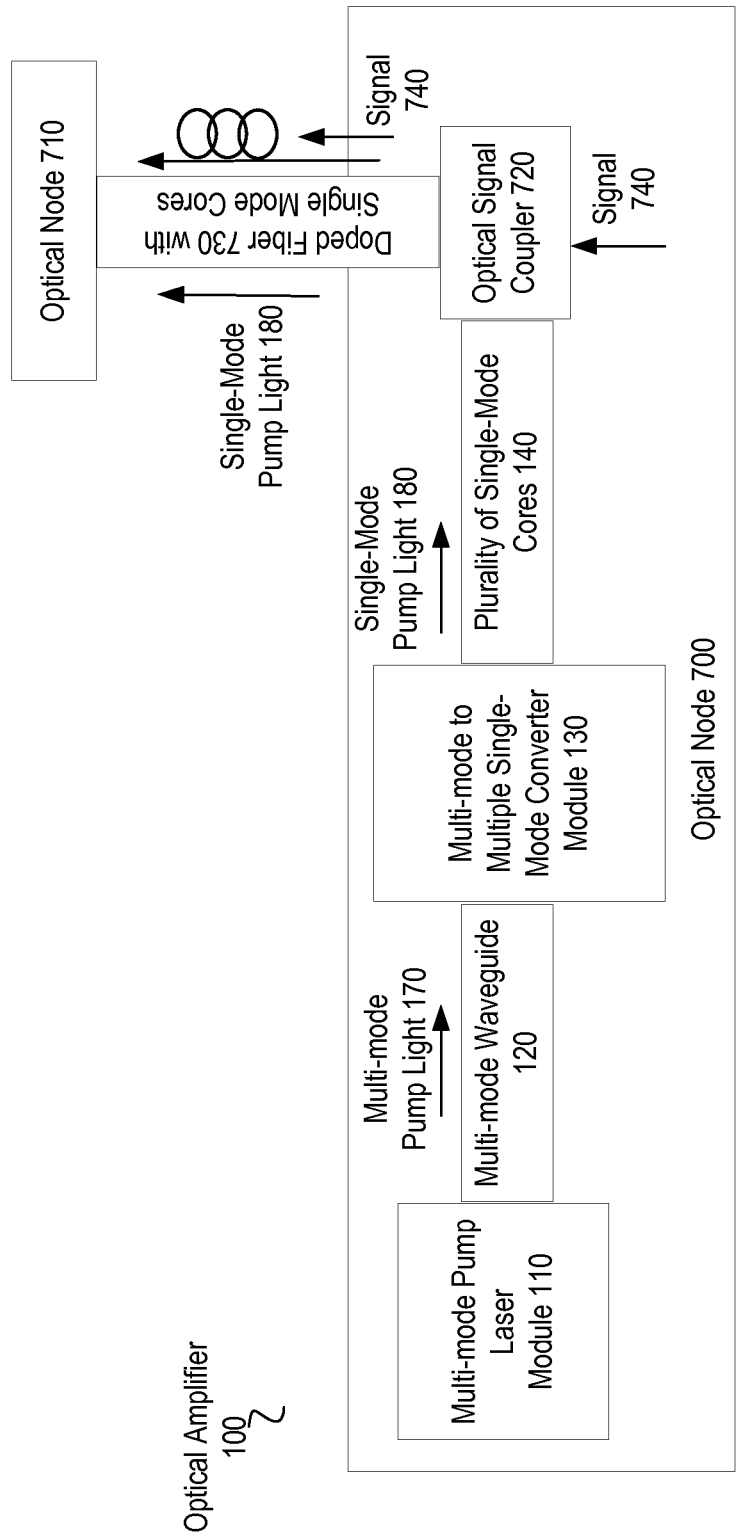
FIG. 10 illustrates a schematic block diagram of an embodiment in which pump and signal light co-propagate between an optical node and an optical amplifier such as described in any of FIGS. 1A-C, 2A, 3A, 4A, 5A, and 6-9.

FIG. 10 illustrates a schematic block diagram of an embodiment of an optical node 700 including optical amplifier 100. The optical amplifier 100 in this embodiment is a doped-fiber amplifier, such as an Erbium-doped fiber amplifier (EDFA). The optical amplifier 100 includes a multi-mode pump laser module 110, multi-mode waveguide 120, a multi-mode to multiple single-mode fiber converter module 130 and a plurality of single-mode cores 140. The plurality of single-mode cores 140 is operably coupled to doped fiber 730 by optical signal coupler 720. The doped fiber 730 includes a plurality of single-mode cores, e.g. a multi-core single-mode fiber or a plurality of active single-mode fibers or a combination thereof.

In operation, the optical signal coupler 720 receives signal 740 from a multi-core fiber or a plurality of active single-mode fibers. The optical signal coupler 720 couples or multiplexes the single-mode pump light 180 from the plurality of single-mode cores 140 in a one to one manner to active cores of doped fiber 730. The doped fiber 730 receives the single-mode pump light 180 and signal 740. The pump light 180 excites the dopant ions, e.g. $Er^{+3}$, and thereby amplifies the signal 740 by stimulated emission of photons from the excited dopant ions. The amplified signal 740 propagates to another optical node 710. The multi-mode laser pump module 110 is thus operable to pump light into active cores of doped fiber 730 to achieve a core-pumped amplifier.

Optical node 700 and optical node 710 in FIG. 10 may further include one or more of an add/drop multiplexer, optical transmitter, optical receiver, optical to electrical convertor, electrical to optical convertor, etc.

Figure 11:
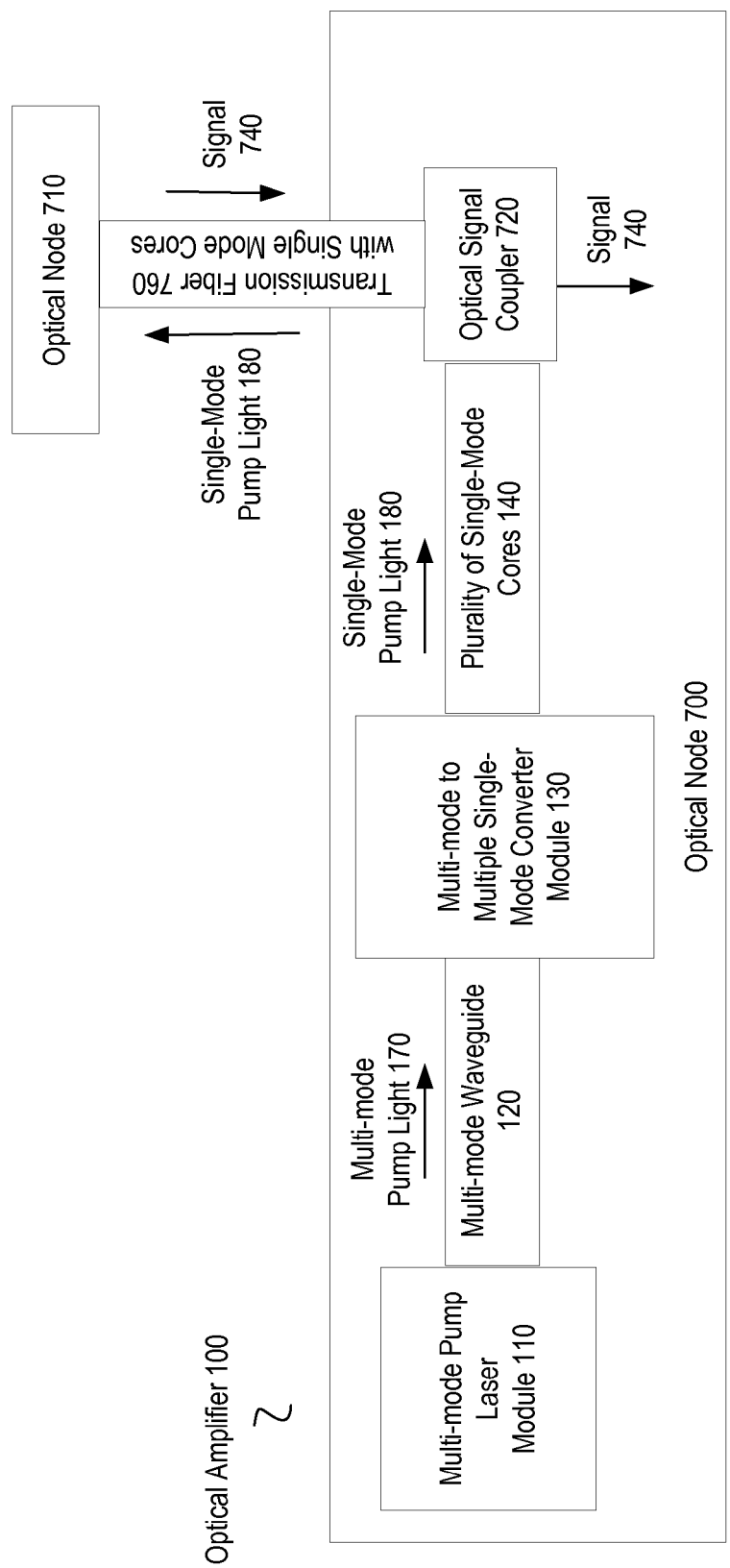
FIG. 11 illustrates a schematic block diagram of another embodiment in which pump and signal light counter-propagate between an optical node and an optical amplifier such as described in any of FIGS. 1A-C, 2A, 3A, 4A, 5A, and 6-9.

FIG. 11 illustrates a schematic block diagram of another embodiment of an optical node 700 including optical amplifier 100. In this embodiment, the optical amplifier 100 is operable for Raman amplification of optical signals. The optical amplifier 100 includes a multi-mode pump laser module 110, multi-mode waveguide 120, a multi-mode to multiple single-mode fiber converter module 130 and a plurality of single-mode cores 140. The plurality of single-mode cores 140 is operably coupled to transmission fiber 760 by optical signal coupler 720. The transmission fiber 760 includes a plurality of single-mode cores, e.g. a multi-core single-mode fiber or a plurality of active single-mode fibers or a combination thereof. In this embodiment, the Raman amplifier is a counter-propagating pump amplifier. In other embodiments (not shown) a co-pumped amplifier may be implemented instead or in addition to the counter-propagating pump.

In operation, in one embodiment, the optical signal coupler 720 de-multiplexes or decouples received amplified signal light 740 from the transmission fiber 760. The optical signal coupler 720 also couples single-mode pump light 180 from the plurality of single-mode cores 140 in a one to one manner to active cores of transmission fiber 760. When pumped by counter-propagating pump light 180, transmission fiber 760 operates as a distributed Raman amplifier to amplify signal 740. In some embodiments, the doped fiber 730 (FIG. 10) or transmission fiber 760 (FIG. 11) may be located within the optical node 700. The multi-mode laser pump module 110 is thus operable to pump light into active cores of transmission fiber 760 to achieve a core-pumped amplifier, either by EDFA or Raman amplification.

Optical node 700 and optical node 710 in FIG. 11 may further include one or more of an add/drop multiplexer, optical transmitter, optical receiver, optical to electrical convertor, electrical to optical convertor, etc.

In various embodiments, the optical amplifier described herein distributes pump light from a multi-mode pump to a plurality of single-mode cores (e.g., either of a multi-core fiber or to a plurality of single-mode fibers) using a multi-mode to multiple single-mode converter module. Thus, embodiments described herein are operable to employ a high power but less complex and less expensive multi-mode pump laser in a core-pumped optical amplifier.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The term "module" is used in the description of the various embodiments of the disclosure. A "module" indicates a device that includes one or more additional components, such as a single processing device or a plurality of processing devices, a functional block, hardware and software stored on memory for performing one or more functions as may be described herein. Note that, if the module is implemented via hardware, the hardware may operate independently and/or in conjunction with software and/or firmware. As used herein, a module may contain one or more sub-modules, each of which may be one or more modules. As may also be used herein, a module may include one or more additional components, such as a single processing device or a plurality of processing devices.

The boundaries and sequence of these functional building blocks may have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The disclosure may have also been described, at least in part, in terms of one or more embodiments. An embodiment of the disclosure is used herein to illustrate the disclosure, an aspect thereof, a feature thereof, a concept thereof, and/or an example thereof. A physical embodiment of an apparatus, an article of manufacture, a machine, and/or of a process that embodies the disclosure may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the disclosure have been expressly described herein, other combinations of these features and functions are likewise possible. The disclosure is not limited by the particular examples disclosed herein and expressly incorporates these other combinations.

What is claimed is:

1. An optical amplifier, comprising:
   a laser module operable to emit a multi-mode pump light;
   a first plurality of single-mode cores, wherein the single-mode cores are operable to propagate single-mode light; and
   a converter module including a fiber having a cladding and a second plurality of single-mode cores, wherein the fiber includes:
   an input configured to receive the multi-mode pump light from the laser module and to substantially propagate the multi-mode pump light through the cladding of the fiber; and
   an output configured to substantially absorb the multi-mode pump light into the second plurality of single-mode cores to convert the multi-mode pump light to single-mode pump light and distribute the single-mode pump light in the second plurality of single mode cores to the first plurality of single-mode cores.

2. The optical amplifier of claim 1, wherein the second plurality of single-mode cores includes a multi-core fiber.

3. The optical amplifier of claim 1, wherein the converter module comprises an adiabatic taper, wherein at an input, the fiber has a capillary with an effective low refractive index operable to substantially reflect the multi-mode pump light into the cladding and wherein the single-mode cores are operably spaced to allow the multi-mode pump light received at the input to substantially propagate through cladding of the fiber.

4. The optical amplifier of claim 3, wherein a diameter of the fiber expands from the input to an output to allow the pump light to be substantially absorbed by the second plurality of single-mode cores and wherein at the output, the second plurality of single-mode cores effectively behave as a plurality of single-mode waveguides for emitting the single-mode pump light.

5. The optical amplifier of claim 4, wherein the fiber is a multi-core fiber including the second plurality of single-mode cores.

6. An optical node, including:
a laser module operable to emit a multi-mode pump light;
a first plurality of single-mode cores, wherein the single-mode cores are operable to propagate single-mode light; and
a converter module including a fiber with cladding and a second plurality of single mode cores operable to:
receive the multi-mode pump light from the laser module and to substantially propagate the multi-mode pump light through the cladding of the fiber; and
an output configured to substantially absorb the multi-mode pump light into the second plurality of single-mode cores to convert the multi-mode pump light to single-mode pump light and distribute the single-mode pump light in the second plurality of single mode cores to the first plurality of single-mode cores; and
an optical signal coupler operably coupled to the converter module and a transmission fiber, wherein the optical signal coupler multiplexes the single-mode pump light from one of the plurality of first single-mode cores to at least one single-mode core of the transmission fiber.

7. The optical node of claim 6, wherein the transmission fiber includes an erbium doped fiber segment for amplification of a signal.

8. The optical node of claim 6, wherein the transmission fiber uses Raman amplification to amplify a signal using the single-mode pump light.

9. The optical node of claim 6, wherein the converter module comprises an adiabatic taper, wherein at an input, the fiber has a capillary with an effective low refractive index operable to substantially reflect the multi-mode pump light into the cladding of the fiber and wherein the second plurality of single-mode cores are operably spaced to allow the multi-mode pump light received at the input to substantially propagate through the cladding of the fiber; and
wherein a diameter of the fiber expands from the input to an output to allow the multi-mode pump light to be substantially absorbed by the second plurality of single-mode cores and wherein at the output, the second plurality of single-mode cores effectively behave as a plurality of single-mode waveguides for emitting the single-mode pump light.

10. An optical node, comprising:
a multi-mode pump laser module operable to emit pump light with a single transverse mode substantially aligned along an axis;
a plurality of single-mode cores, wherein the single-mode cores are operable to propagate single-mode light; and
a converter module including:
a planar lantern, wherein the planar lantern includes a plurality of single-mode waveguides transversely spaced along the axis aligned with the single transverse mode of the planar multi-mode laser to propagate the pump light to the plurality of single-mode cores.

11. The optical node of claim 10, wherein the converter module further comprises a scrambler to scramble additional leaked modes of the pump light.

12. The optical node of claim 10, wherein the plurality of single-mode waveguides diverge from an input to an output to an output of the planar lantern to scramble additional leaked modes of the pump light.

13. The optical node of claim 12, wherein individual ones of the plurality of single-mode waveguides have an effective normalized frequency parameter V equal to approximately or less than 2.405 at the input and the output of the planar lantern.

* * * * *